United States Patent
Choo et al.

(10) Patent No.: US 12,378,418 B2
(45) Date of Patent: Aug. 5, 2025

(54) PHOTOCURABLE SILICONE COMPOSITION AND CURED PRODUCT THEREOF

(71) Applicant: DOW SILICONES CORPORATION, Midland, MI (US)

(72) Inventors: Hyeokseong Choo, Chungcheongbuk-do (KR); Min Hee Kwon, Chungcheongbuk-do (KR)

(73) Assignee: DOW SILICONES CORPORATION, Midland, MI (US)

( * ) Notice: Subject to any disclaimer, the term of this patent is extended or adjusted under 35 U.S.C. 154(b) by 547 days.

(21) Appl. No.: 17/800,342

(22) PCT Filed: Feb. 18, 2021

(86) PCT No.: PCT/US2021/018521
§ 371 (c)(1),
(2) Date: Aug. 17, 2022

(87) PCT Pub. No.: WO2021/168075
PCT Pub. Date: Aug. 26, 2021

(65) Prior Publication Data
US 2023/0101534 A1    Mar. 30, 2023

Related U.S. Application Data

(60) Provisional application No. 62/980,357, filed on Feb. 23, 2020.

(51) Int. Cl.
| | | |
|---|---|---|
| *C08L 83/10* | (2006.01) | |
| *C08G 77/28* | (2006.01) | |
| *C08G 77/392* | (2006.01) | |
| *C08G 77/42* | (2006.01) | |
| *C09D 183/10* | (2006.01) | |
| *C09J 183/10* | (2006.01) | |

(52) U.S. Cl.
CPC ............. *C08L 83/10* (2013.01); *C08G 77/28* (2013.01); *C08G 77/392* (2013.01); *C08G 77/42* (2013.01); *C09D 183/10* (2013.01); *C09J 183/10* (2013.01); *C08L 2201/10* (2013.01)

(58) Field of Classification Search
CPC ................................ C08G 77/28; C08G 77/42
See application file for complete search history.

(56) References Cited

U.S. PATENT DOCUMENTS

| | | |
|---|---|---|
| 5,169,879 A | 12/1992 | Lee et al. |
| 9,944,742 B2 | 4/2018 | Saxena et al. |
| 9,994,754 B2 | 6/2018 | Clough |
| 2008/0160323 A1 | 7/2008 | Mosley et al. |
| 2013/0065983 A1 | 3/2013 | Ono et al. |
| 2015/0232666 A1 | 8/2015 | Ono et al. |
| 2016/0032102 A1 | 2/2016 | Srikanth et al. |
| 2016/0244625 A1 | 8/2016 | Clapp et al. |
| 2019/0112430 A1 | 4/2019 | Yook et al. |
| 2020/0032111 A1 | 1/2020 | Ogawa et al. |

FOREIGN PATENT DOCUMENTS

| | | |
|---|---|---|
| CN | 104004357 A | 8/2014 |
| EP | 2537878 A1 | 12/2012 |
| JP | 2005171189 A | 6/2005 |
| JP | 2011202128 A | 10/2011 |
| JP | 2013253179 A | 12/2013 |
| JP | 2015071741 A | 4/2015 |
| JP | 2015193820 A * | 11/2015 |
| WO | 2015036414 A1 | 3/2015 |
| WO | 2017082180 A1 | 5/2017 |
| WO | 2018117974 A1 | 6/2018 |
| WO | 2019099347 A1 | 5/2019 |
| WO | WO-2021126178 A1 * | 6/2021 |

OTHER PUBLICATIONS

Machine translation of JP 2015-193820 (no date).*
Machine assisted English translation of JP2011202128A obtained from https://patents.google.com/patent on Feb. 20, 2023, 9 pages.
Machine assisted English translation of JP2015071741A obtained from https://patents.google.com/patent on Feb. 20, 2023, 24 pages.
International Search Report for PCT/US2021/018521 dated Jun. 11, 2021, 4 pages.
Machine assisted English translation of EP2537878A1 obtained from https://patents.google.com/patent on Dec. 4, 2022, 13 pages.
Machine assisted English translation of CN104004357A obtained from https://patents.google.com/patent on Dec. 4, 2022, 11 pages.
Machine assisted English translation of JP2013253179A obtained from https://patents.google.com/patent on Dec. 4, 2022, 10 pages.
Machine assisted English translation of JP2005171189A obtained from https://patents.google.com/patent on Dec. 4, 2022, 5 pages.

* cited by examiner

*Primary Examiner* — Marc S Zimmer
(74) *Attorney, Agent, or Firm* — Warner Norcross + Judd LLP

(57) ABSTRACT

A UV-curable silicone composition is disclosed. The UV-curable silicone composition comprises: (A) an organopolysiloxane having at least two alkenyl groups and at least one aryl group in a molecule; (B) a polysiloxane block copolymer comprising: (i) a polysiloxane block and (ii) an organo block, wherein the polysiloxane block (i) is bonded to the organo block (ii) via a specific linkage, and wherein the polysiloxane block copolymer has at least two thiol groups in a molecule; (C) a photoinitiator; and (D) an inorganic filler. The composition exhibits excellent transparency even if an inorganic filler is added to improve thixotropic property.

10 Claims, No Drawings

PHOTOCURABLE SILICONE COMPOSITION AND CURED PRODUCT THEREOF

CROSS-REFERENCE TO RELATED APPLICATIONS

This application is the U.S. National Stage of International Application No. PCT/US2021/018521 filed on 18 Feb. 2021, which claims priority to and all advantages of U.S. Provisional Patent Application No. 62/980,357 filed on 23 Feb. 2020, the content of which is incorporated herein by reference.

FIELD OF THE INVENTION

The present invention relates to a photocurable silicone composition and a cured product thereof.

DESCRIPTION OF THE RELATED ART

Curable silicone compositions having good optical transparency and mechanical properties are utilized as adhesives or encapsulants. Photocurable silicone compositions enabling relatively low curing temperature are mainly used for an optical display because thermally instable components like liquid crystalline, OLED, touch panel, and cover lens are needed to use the image display unit. A thixotropic property of the photocurable silicone composition has recently been required to improve dimensional accuracy and productivity of the optical display. For example, a high thixotropic curable silicone composition can be used as a stencil/screen printable material or a dam material for the optical display.

Patent Document 1 discloses a photocurable silicone resin composition comprising: an organopolysiloxane having silicon atom-bonded mercaptoalkyl groups, an organopolysiloxane having silicon atom-bonded aliphatic unsaturated groups, a photoinitiator, and a silane compound having an aliphatic unsaturated group. However, such a photocurable silicone resin composition has a problem that the composition exhibits poor thixotropic property.

While, Patent Document 2 discloses a thixotropic photocurable silicone composition comprising: an organopolysiloxane having silicon atom-bonded mercaptoalkyl groups, an organopolysiloxane having silicon atom-bonded aliphatic unsaturated groups including a linear organopolysiloxane and optionally including a branched organopolysiloxane, a photoinitiator, and a fumed silica having a BET specific surface area of 180 to 500 m$^2$/g. Patent Document 3 discloses a photocurable silicone composition comprising: a mercapto-functional organopolysiloxane having the unit formula: $[(CH_3)_3SiO_{1/2}]_x[(CH_3)_2SiO]_y[R(CH_3)SiO]_z$, wherein "x" is about 0.01 to about 0.1, "y" is about 0 to about 0.94, "z" is about 0.05 to about 0.99, and at each occurrence R is independently a mercapto hydrocarbyl group, an organopolysiloxane having ate least two aliphatic unsaturated carbon-carbon bonds, a filler, and a photoinitiator. However, such a photocurable silicone composition has a problem that the composition exhibits poor transparency.

Therefore, it is desired to develop a photocurable silicone composition, which exhibits excellent transparency even if an inorganic filler is added to improve thixotropic property.

CITATION LIST

Patent Document 1: US Patent Application Publication No. 2013/0065983 A1

Patent Document 2: US Patent Application Publication No. 2015/0232666 A1

Patent Document 3: US Patent Application Publication No. 2016/0244625 A1

SUMMARY OF THE INVENTION

Technical Problem

An object of the present invention is to provide a photocurable silicone composition that exhibits excellent transparency even if an inorganic filler is added to improve thixotropic property. Another object of the present invention is to provide a cured product exhibiting excellent transparency.

Solution to Problem

The photocurable silicone composition of the present invention comprises:
(A) an organopolysiloxane represented by the following average composition formula:

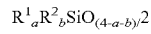

$R^1{}_a R^2{}_b SiO_{(4-a-b)/2}$ wherein, $R^1$ is a $C_{2-12}$ alkenyl group; $R^2$ is a $C_{1-12}$ alkyl group, a $C_{6-12}$ aryl group, or a $C_{7-12}$ aralkyl group; provided that at least one $R^2$ in a molecule is the aryl group or the aralkyl group; and "a" and "b" are positive numbers satisfying: 1≤a+b≤2.5 and 0.001≤a/(a+b)0.2;
(B) a polysiloxane block copolymer comprising:
(i) a polysiloxane block represented by the general formula: $(R^3{}_2 SiO)_n$, wherein each $R^3$ is independently a $C_{1-12}$ alkyl group, a $C_{6-12}$ aryl group, or a $C_{7-12}$ aralkyl group; and "n" is a positive number of at least about 5; and
(ii) an organo block containing at least three sulfur atoms and free of silicon atom in a chemical structure thereof,
wherein the polysiloxane block (i) is bonded to the organo block (ii) via a linkage represented by the general formula: (Si)—$R^4$—(S), wherein Si is an atom in a chemical structure of the polysiloxane block (i); S is an atom in a chemical structure of the organo block (ii); and $R^4$ is a $C_{2-6}$ alkylene group, and
wherein the polysiloxane block copolymer has at least two thiol (HS-) groups in a molecule, in an amount such that the thiol groups in component (B) is in a range of from 0.2 to 2.0 moles per 1 mole of the total alkenyl groups in component (A);
(C) a photoinitiator, in an amount of from about 0.01 to about 5 parts by mass per 100 parts by mass of a total mass of components (A) and (B); and
(D) an inorganic filler, in an amount of from about 0.01 to about 40 parts by mass per 100 parts by mass of a total mass of components (A) and (B).

In various embodiments, the polysiloxane block (i) in component (B) is at least one selected from a group consisting of a polysiloxane block represented by the following formula:

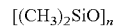

$[(CH_3)_2 SiO]_n$ a polysiloxane block represented by the following formula:

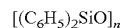

$[(C_6H_5)_2 SiO]_n$ a polysiloxane block represented by the following formula:

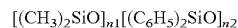

$[(CH_3)_2 SiO]_{n1}[(C_6H_5)_2 SiO]_{n2}$ and a polysiloxane represented by the following formula:

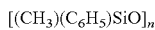

wherein each "n" is a positive number of at least about 5; and each "n1" and "n2" is a positive number, provided that "n1+n2" is a positive number of at least about 5.

In various embodiments, the organo block (ii) in component (B) is at least one selected form a group consisting of an organo block represented by the following formula:

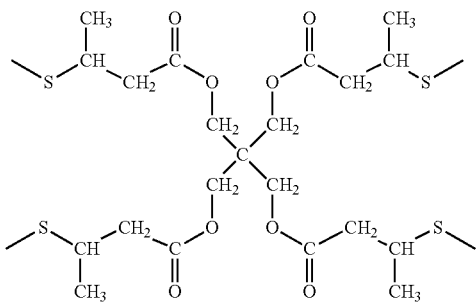

an organo block represented by the following formula:

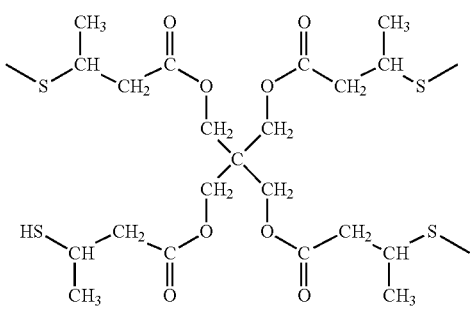

an organo block represented by the following formula:

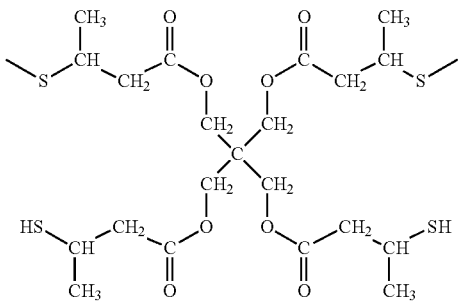

an organo block represented by the following formula:

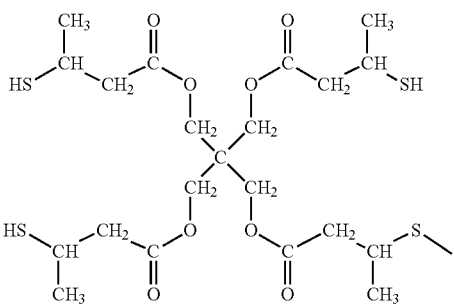 [SMILES: CSC(C)CC(=O)OCC(COC(=O)CC(C)S)(COC(=O)CC(C)S)COC(=O)CC(C)S]

an organo block represented by the following formula:

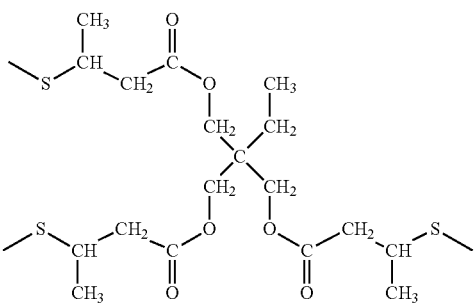

an organo block represented by the following formula:

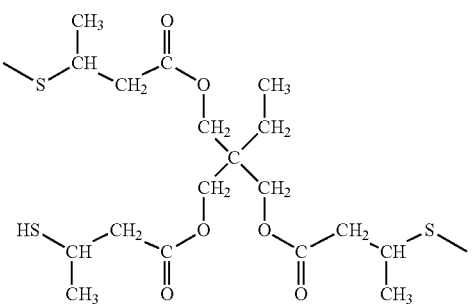

and an organo block represented by the following formula:

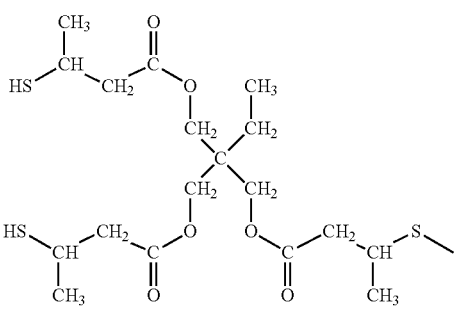 [SMILES: CCC(COC(=O)CC(C)S)(COC(=O)CC(C)S)COC(=O)CC(C)SC]

In various embodiments, the content of the polysiloxane block (i) in component (B) is in a range of from about 60 to about 90 mass % of the sum of the polysiloxane block (i) and the organo block (ii).

In various embodiments, component (B) is a reaction product produced by reaction of:
(B1) a polysiloxane represented by the general formula:

$$R^5(R^3{}_2SiO)_nSiR^3{}_2R^5$$

wherein each $R^3$ is independently a $C_{1-12}$ alkyl group, a $C_{6-12}$ aryl group, or a $C_{7-12}$ aralkyl group; each $R^5$ is independently a $C_{2-6}$ alkenyl group; and "n" is a positive number of at least about 5; and (B2) an organo compound having at least three thiol groups in a molecule, in a presence of (B3) a photoinitiator by irradiation with UV ray.

In various embodiments, raw material (B1) is at least one selected from a group consisting of a polysiloxane represented by the following formula:

$$(CH_3)_2(CH_2=CH)SiO[(CH_3)_2SiO]_nSi(CH_3)_2(CH=CH_2)$$

a polysiloxane represented by the following formula:

$$(CH_3)_2(CH_2=CH)SiO[(C_6H_5)_2SiO]_nSi(CH_3)_2(CH=CH_2)$$

a polysiloxane represented by the following formula:

$$(C_6H_5)_2(CH_2=CH)SiO[(CH_3)_2SiO]_nSi(C_6H_5)_2(CH=CH_2)$$

a polysiloxane represented by the following formula:

$$(CH_3)_2(CH_2=CH)SiO[(CH_3)_2SiO]_{n1}[(C_6H_5)_2SiO]_{n2}Si(CH_3)_2(CH=CH_2)$$

and a polysiloxane represented by the following formula:

$$(CH_3)_2(CH_2=CH)SiO[(CH_3)(C_6H_5)SiO]_nSi(CH_3)_2(CH=CH_2)$$

wherein each "n" is a positive number of at least about 5; and each "n1" and "n2" is a positive number, provided that "n1+n2" is a positive number of at least about 5.

In various embodiments, raw material (B1) has a number average molecular weight of from about 500 to about 50,000 in accordance with a standard polystyrene basis by gel permeation chromatography.

In various embodiments, raw material (B2) is at least one selected from a group consisting of an organo compound represented by the following formula:

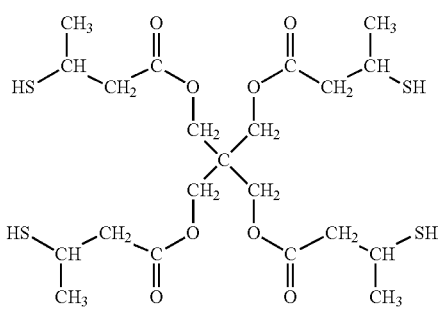

and an organo compound represented by the following formula:

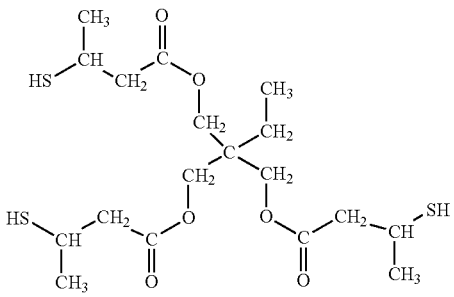

In various embodiments, a reaction amount of raw material (B2) is in an amount such that the thiol groups in raw material (B2) is in a range of from about 2.0 to about 10.0 moles per 1 mole of the total alkenyl groups in raw material (B1).

The cured product of the present invention is characterized by being obtained by irradiating the photocurable silicone composition described above with light.

Effects of Invention

The photocurable silicone composition of the present invention exhibits excellent thixotropic property without failing its transparency. Furthermore, the cured product of the present invention exhibits excellent transparency.

DETAILED DESCRIPTION OF THE INVENTION

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, the term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The terms "polysiloxane block copolymer" used herein are designed to mean reaction products of a polysiloxane and an organo compound which does not have a siloxane unit, or compositions essentially consisting of the reaction products. The polysiloxane block copolymer is generally formed having linear and/or three-dimensional units, typically formed via ene-thiol reactions.

<Photocurable silicone composition>

Component (A) is a base compound of the present composition and is an organopolysiloxane represented by the average composition formula:

$$R^1_a R^2_b SiO_{(4-a-b)/2}$$

In the formula, $R^1$ is a $C_{2-12}$ alkenyl group, and examples thereof include vinyl group, allyl group, butenyl group, pentenyl group, hexenyl group, heptenyl group, octenyl group, nonenyl group, decenyl group, undecenyl group, and dodecenyl group. Among these, vinyl group and hexenyl group are preferred.

In the formula, $R^2$ is a $C_{1-12}$ alkyl group, a $C_{6-12}$ aryl group, or a $C_{7-12}$ aralkyl group. Examples of the alkyl group include methyl group, ethyl group, propyl group, isopropyl group, butyl group, pentyl group, hexyl group, heptyl group, octyl group, nonyl group, decyl group, undecyl group, and dodecyl group. Among these, methyl group is preferred. Examples of the aryl group include phenyl group, tolyl group, naphthyl group, and biphenyl group. Among these, phenyl group is preferred. Examples of the aralkyl group include phenylmethyl group, 1-phenylethyl group, 2-phenylethyl group, and 2-phenylpropyl group. Among these, 2-phenylethyl group and 2-phenylpropyl group are preferred. In component (A), at least one $R^2$ in a molecule is the aryl group or the aralkyl group. In certain embodiments, at least 10 mol %, alternatively at least 15 mol % of $R^2$ in a molecule are the aryl groups.

Furthermore, in the formula, "a" and "b" are positive numbers satisfying: $1 \leq a+b \leq 2.5$, and preferably $1.5 \leq a+b \leq 2.2$, and satisfying: $0.001 \leq a/(a+b) \leq 0.2$, and preferably $0.001 \leq a/(a+b) \leq 0.1$.

Component (A) may be one type of organopolysiloxane that satisfies the average composition formula above or may be a mixture of at least two types of organopolysiloxanes that satisfy the average composition formula above.

The state of component (A) at 25° C. is not limited and is preferably a liquid. The viscosity at 25° C. of component (A) is not limited; however, the viscosity is preferably in a range of 100 to 1,000,000 mPa·s. Note that in the present specification, viscosity is the value measured using a type B viscometer according to ASTM D 1084 at 23±2° C.

Component (B) is a curing agent of the present composition and is a polysiloxane block copolymer comprising: (i) a polysiloxane block and (ii) an organo block. The polysiloxane block (i) is represented by the general formula: $(R^3_2SiO)_n$.

In the formula, each $R^3$ is independently a $C_{1-12}$ alkyl group, a $C_{6-12}$ aryl group, or a $C_{7-12}$ aralkyl group. Examples of such groups for $R^3$ include the groups described above for $R^2$. In certain embodiments, $R^3$ is a methyl group or a phenyl group.

In the formula, "n" is a positive number of at least about 5, preferably at least about 10. This is because, when "n" is greater than or equal to the lower limit described above, compatibility of component (B) to component (A) can increase.

The polysiloxane block (i) is not limited, but is preferably at least one selected from a group consisting of a polysiloxane block represented by the following formula:

$$[(CH_3)_2SiO]_n$$

a polysiloxane block represented by the following formula:

$$[(C_6H_5)_2SiO]_n$$

a polysiloxane block represented by the following formula:

$$[(CH_3)_2SiO]_{n1}[(C_6H_5)_2SiO]_{n2}$$

and a polysiloxane represented by the following formula:

$$[(CH_3)(C_6H_5)SiO]_n$$

wherein each "n" is a positive number of at least 5; and each "n1" and "n2" is a positive number, provided that "n1+n2" is a positive number of at least about 5.

The polysiloxane block (i) essentially comprises the polysiloxane block represented by the general formula: $(R^3_2SiO)_n$, but it may comprise other siloxane units such as $R^3_3SiO_{1/2}$, $R^3SiO_{3/2}$, and $SiO_{4/2}$.

The organo block (ii) contains at least three sulfur atoms and is free of silicon (Si) atom in a chemical structure thereof. The organo block (ii) is not limited, but it is preferably at least one selected form a group consisting of an organo block represented by the following formula:

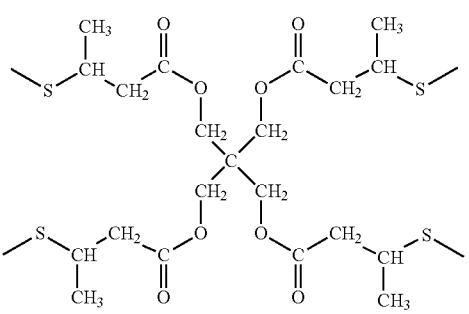

an organo block represented by the following formula:

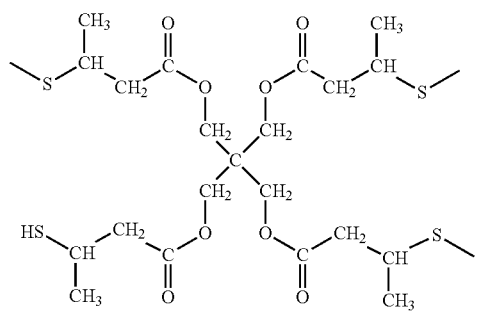

an organo block represented by the following formula:

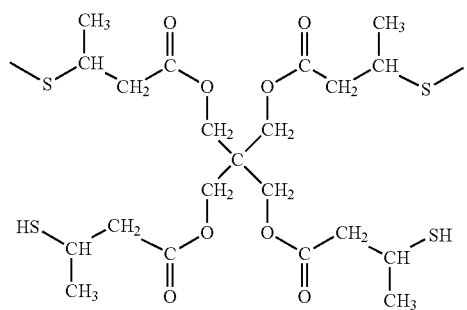

an organo block represented by the following formula:

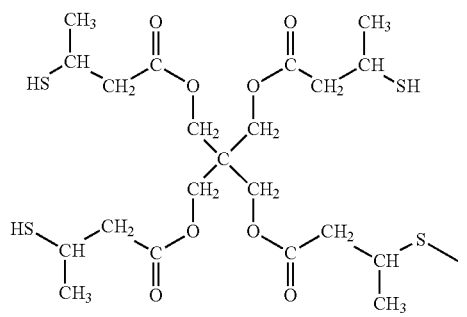 [SMILES: CSC(C)CC(=O)OCC(COC(=O)CC(C)S)(COC(=O)CC(C)S)COC(=O)CC(C)S]

an organo block represented by the following formula:

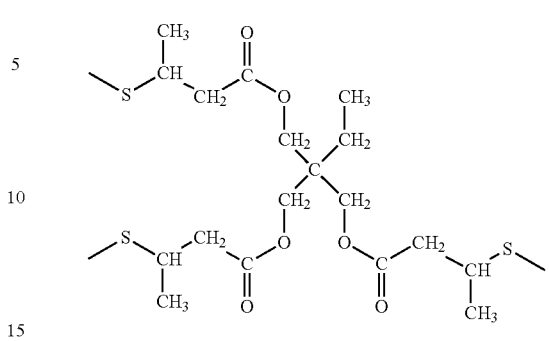

an organo block represented by the following formula:

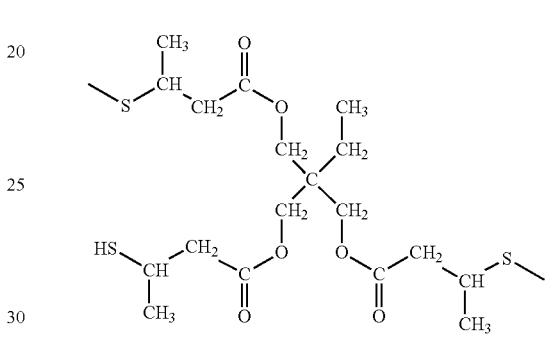

and an organo block represented by the following formula:

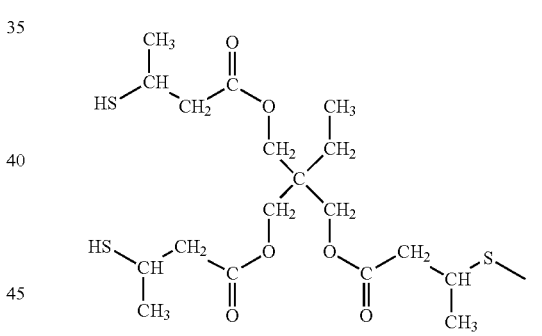

The polysiloxane block (i) is bonded to the organo block (ii) via a linkage represented by the general formula: (Si)—$R^4$—(S).

In the formula, Si is an atom in a chemical structure of the polysiloxane block (i) and S is an atom in a chemical structure of the organo block (ii).

In the formula, $R^4$ is a $C_{2-6}$ alkylene group. Examples of the alkenyl group include vinyl groups, allyl groups, butenyl groups, pentenyl groups, heptenyl groups, and hexenyl groups.

The content of the polysiloxane block (i) in component (B) is not limited, but it is preferably in a range of from about 60 to about 90 mass % of the sum of the polysiloxane block (i) and the organo block (ii).

Component (B) has at least two thiol (HS-) groups in a molecule. The bonding positions of the thiol groups in the polysiloxane block copolymer for component (B) are not particularly limited, and examples thereof include a position in the organo block (ii) other than the organo block represented by the following formula:

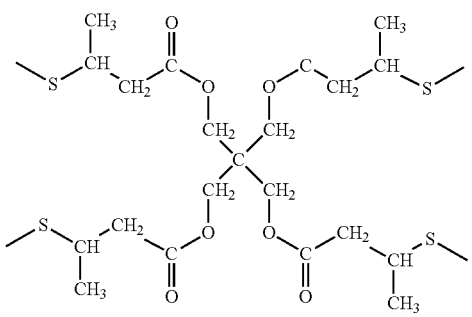

and the organo block represented by the following formula:

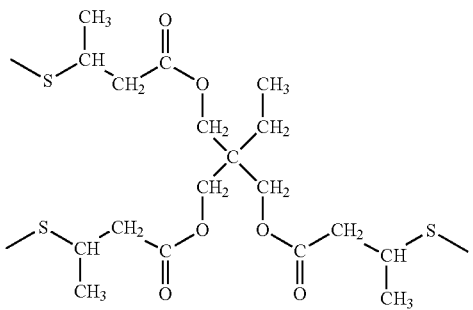

The number average molecular weight (Mn) of the polysiloxane block copolymer for component (B) on a standard polystyrene basis by gel permeation chromatography is not limited, but it is preferably in the range from about 3,000 to about 50,000, alternatively in the range from about 4,000 to about 10,000. This is because, when the molecular weight of the polysiloxane block copolymer is within the range described above, the resulting silicone block copolymer can promote to form a cured product having excellent tensile strength and low modulus.

A method of producing the polysiloxane block copolymer for component (B) is not limited, but is preferably a method characterized by reacting (B1) a polysiloxane represented by the general formula:

$$R^5(R^3{}_2SiO)_nSiR^3{}_2R^5$$

wherein each $R^3$ is independently a $C_{1-12}$ alkyl group, a $C_{6-12}$ aryl group, or a $C_{7-12}$ aralkyl group; each $R^5$ is independently a $C_{2-6}$ alkenyl group; and "n" is a positive number of at least about 5; and (B2) an organo compound having at least three thiol groups in a molecule, in a presence of a photoinitiator (B3) by irradiation with UV ray.

Raw material (B1) is not limited, but is preferably at least one selected from a group consisting of a polysiloxane represented by the following formula:

$$(CH_3)_2(CH_2\!=\!CH)SiO[(CH_3)_2SiO]_nSi(CH_3)_2(CH\!=\!CH_2)$$

a group consisting of a polysiloxane represented by the following formula:

$$(CH_3)_2(CH_2\!=\!CH)SiO[(C_6H_5)_2SiO]_nSi(CH_3)_2(CH\!=\!CH_2)$$

a polysiloxane represented by the following formula:

$$(C_6H_5)_2(CH_2\!=\!CH)SiO[(CH_3)_2SiO]_nSi(C_6H_5)_2(CH\!=\!CH_2)$$

a polysiloxane represented by the following formula:

$$(CH_3)_2(CH_2\!=\!CH)SiO[(CH_3)_2SiO]_{n1}[(C_6H_5)_2SiO]_{n2}Si(CH_3)_2(CH\!=\!CH_2)$$

and a polysiloxane represented by the following formula:

$$(CH_3)_2(CH_2\!=\!CH)SiO[(CH_3)(C_6H_5)SiO]_nSi(CH_3)_2(CH\!=\!CH_2)$$

wherein each "n" is a positive number of at least about 5; and each "n1" and "n2" is a positive number, provided that "n1+n2" is a positive number of at least about 5.

Raw material (B1) preferably has a number average molecular weight of about 500 from about 50,000 in accordance with a standard polystyrene basis by gel permeation chromatography.

Raw material (B2) is not limited as long as an organo component has at least three thiol groups in a molecule, but it is preferably at least one selected from a group consisting of an organo compound represented by the following formula:

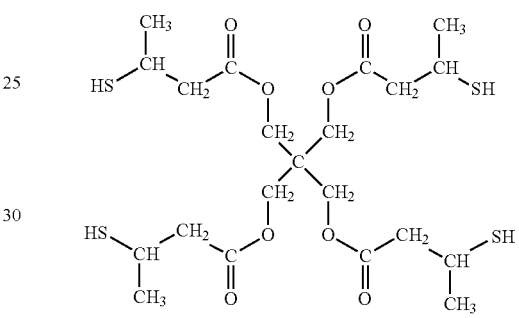

and an organo compound represented by the following formula:

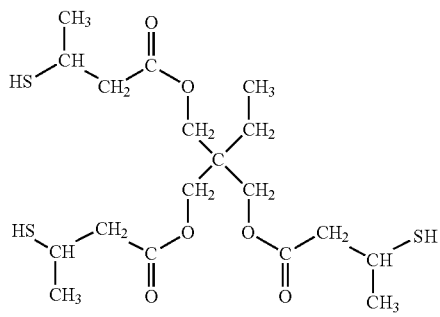 [SMILES: CCC(COC(=O)CC(C)S)(COC(=O)CC(C)S)COC(=O)CC(C)S]

A reaction amount of raw material (B2) is not limited but it is preferably in an amount such that the thiol groups in raw material (B2) is in a range of from about 2.0 to about 10.0 moles, alternatively in a range of from about 2.5 to about 10.0 moles, or alternatively in a range of from about 2.5 to about 8.0 moles, per 1 mole of the total alkenyl groups in raw material (B1). This is because, when the reaction amount of raw material (B2) is within the range described above, transparency of the resulting polysiloxane block copolymer increases.

The reaction is initiated in a presence of raw material (B3) by irradiation with UV ray. Raw material (B3) is not limited. Examples of raw material (B3) include phenone type photoinitiators such as 2,2-dimethoxy-1,2-diphenylethan-1-one (IRGACURE 651: manufactured by BASF), 2-hydroxy-2- methyl-1-phenyl-propan-1-one (DAROCUR 1173: manufactured by BASF), 1-hydroxy-cyclohexyl-phenyl-ketone (IRGACURE 184: manufactured by BASF), 1-[4-(2-hydroxyethoxy) phenyl]-2-hydroxy-2-methyl-1-propan-1-one (IRGACURE 2959: manufactured by BASF), 2-hydroxy-1-{4-[4-(2-hydroxy-2-methyl-propionyl) benzyl]-phenyl}-2-methyl-propan-1-one (IRGACURE 127: manufactured by BASF), 2-methyl-1-(4-methylthiophenyl)-2-morpholino-propan-1-one (IRGACURE 907: manufactured by BASF), 2-benzyl-2-dimethylamino-(4-morpholinophenyl)-butanone-1 (IRGACURE 369: manufactured by BASF), and 2-(dimethylamino)-2-[(4-methylphenyl) methyl]-1-[4-(4-morpholinyl) phenyl]-1-butanone (IRGACURE 379: manufactured by BASF); phosphine type photoinitiators such as diphenyl(2,4,6-trimethylbenzoyl)phosphine oxide (TPO, manufactured by BASF), ethyl(2,4,6-trimethylbenzoyl)phenyl phosphonate (TPO-L, manufactured by BASF), and phenylbis(2,4,6-trimethylbenzoyl)phosphine oxide (IRGACURE 819, manufactured by BASF); oxime ester type photoinitiators such as 1,2-octanedione, 1-[4-(phenylthio)-, 2-(O-benzoyl oxime)] (IRGACURE OXE 01: manufactured by BASF), and ethanone, 1-[9-ethyl-6-(2-methylbenzoyl)-9H-carbazol-3-yl]-, 1-(O-acetyloxime) (IRGACURE OXE 02: manufactured by BASF AG); oxyphenylacetic acid type photoinitiators such as oxyphenylacetic acid, 2-[2-oxo-2-phenylacetoxyethoxy] ethyl ester and oxyphenylacetic acid, a mixture of 2-(2-hydroxyethoxy) ethyl ester (IRGACURE 754: manufactured by BASF); phenylglyoxylate type photoinitiators such as phenylglyoxylic acid methyl ester (DAROCUR MBF: manufactured by BASF); benzoate type photoinitiators such as ethyl-4-dimethylaminobenzoate (DAROCUR EDB: manufactured by BASF), and 2-ethylhexyl-4-dimethylaminobenzoate (DAROCUR EHA: manufactured by BASF); and organic peroxide type photoinitiators such as benzoyl peroxide and cumene hydroperoxide. Among them, 1-hydroxy-cyclohexyl-phenyl-ketone (IRGACURE 184: manufactured by BASF), 2,2-dimethoxy-1,2-diphenylethan-1-one (IRGACURE 651: manufactured by BASF), 2-hydroxy-2-methyl-1-phenyl-propan-1-one (DAROCUR 1173: manufactured by BASF), phenylbis(2,4,6-trimethylbenzoyl)phosphine oxide (IRGACURE 819, manufactured by BASF), and ethyl(2,4,6-trimethylbenzoyl) phenyl phosphonate (TPO-L, manufactured by BASF) are preferred. The photoinitiator (C) may be used alone or in combination of two or more.

A reaction amount of raw material (B3) is not limited, but it is preferably in a range of from about 0.001 to about 1 mass %, alternatively in a range of from about 0.005 to about 0.1 mass %, or alternatively in a range of from about 0.005 to about 0.1 mass %, of the total of raw materials (B1), (B2), and (B3).

The reaction is conducted by ultraviolet irradiation. For example, low pressure, high pressure or ultrahigh pressure mercury lamp, metal halide lamp, (pulse) xenon lamp, or an electrodeless lamp is useful as an UV lamp. Irradiation dose is preferably in a range of from 2,000 to 10,000 $mJ/cm^2$, alternatively in a range of from 3,000 to 6,000 $mJ/cm^2$.

The content of component (B) is an amount such that the amount of the thiol groups in component (B) is in a range of from 0.2 to 2.0 moles, or optionally in a range of 0.3 to 1.6 moles, per 1 mole of the total alkenyl groups in component (A). This is because, when the content of component (B) is within the range described above, mechanical strength of the resulting cured product increases.

Component (C) is a photoinitiator to initiate photocuring reaction of the present composition. Examples of such component (C) include the photoinitiators described above for raw material (B3).

The content of component (C) is in a range of from 0.01 to 5 parts by mass, optionally in a range of from 0.05 to 2 parts by mass, or optionally in a range of from 0.1 to 1.5 parts by mass, per 100 parts by mass of a total mass of components (A) and (B). This is because, when the content of component (C) is within the range described above, curing efficiently proceeds to form a cured product having excellent heat resistance and light resistance.

Component (D) is an inorganic filler to impart thixotropic property to the present composition. Examples of the fillers include one or more of finely divided treated or untreated precipitated or fumed silica; and metal oxides such as fumed or precipitated titanium dioxide, cerium oxide, magnesium oxide, zinc oxide, and iron oxide.

The content of component (D) is in an amount of about 0.01 to about 40 parts by mass, alternatively about 0.05 to about 30 parts by mass, and alternatively about 0.05 to about 20 parts by mass, per 100 parts by mass of a total mass of components (A) and (B). This is because thixotropic property of the composition can be improved if the content of component (D) is not less than the Upper limit of the above-mentioned range and transparency of the composition can be improved if the content of component (D) is not more than the upper limit of the above-mentioned range.

The present composition comprises components (A) to (D) described above; however, to impart heat resistance to a cured product of the present composition, mercapto-containing organo compound; and a hindered phenol compound is preferably contained.

Examples of such mercapto-containing organo compounds include o-, m-, or p-xylenedithiol, ethyleneglycol bisthioglycolate, butanediol bisthioglycolate, hexanediol bisthioglycolate, ethyleneglycol bis(3-thiopropionate), butanediol bis(3-thiopropionate), trimethylolpropane tris(3-thiopropionate), pentaerythritol tetrakis(3-thiopropionate), trihydroxyethyl triisocyanuric acid tris(3-thiopropionate), and organopolysiloxanes substituted with a mercapto group. The content of the mercapto-containing organo compounds is not limited; however, the content is preferably in a range of 0.001 to 1 part by mass, and preferably in a range of 0.003 to 0.5 parts by mass, per 100 parts by mass of component (A).

Examples of such hindered phenol compound include pentaerythritol tetrakis[3-(3,5-di-tert-butyl-4-hydroxyphenyl)propionate], thiodiethylene bis[3-(3,5-di-tert-butyl-4-hydroxyphenyl)propionate], octadecyl-3-(3,5-di-tert-butyl-4-hydroxyphenyl)propionate, 2,4-dimethyl-6-(1-methylpentadecyl)phenol, diethyl[{3,5-bis(1,1-di-tert-butyl-4-hydroxyphenyl)methyl}phosphonate, 3 3',3",5,5', 5"-hexane-tert-butyl-4-a,a',a"-(mesitylene-2,4,6-tolyl)tri-p-cresol, 4,6-bis(octylthiomethyl)-o-cresol, ethylenebis(oxyethylene)bis[3-(5-tert-butyl-4-hydroxy-m-tolyl) propionate], and hexamethylene bis[3-(3,5-di-tert-butyl-4-hydroxyphenyl)propionate]. The content of hindered phenol compound is not limited; however, the content is preferably in a range of 0.001 to 1 part by mass, and preferably in a range of 0.003 to 0.5 parts by mass, per 100 parts by mass of component (A).

The present composition may further contain, as an optional component, to enhance storage stability in a light-shielded condition of the present composition, a radical scavenger is preferably contained. Examples of such radical scavenger include hindered amines, such as N,N',N",N"'- tetrakis(4,6-bis(butyl-(N-methyl-2,2,6,6-tetramethylpiperidin-4-yl)amino)-triazin-2-yl)-4,7-diazadecane-1,10-diamine, bis(1,2,2,6,6-pentamethyl-4-piperidyl)[[3,5-bis(1,1-dimethylethyl)-4-hydroxyphenyl]methyl]butylmalonate, methyl-1,2,2,6,6-pentamethyl-4-piperidylsebacate, bis(2,2,6,6-tetramethyl-4-piperidyl)sebacate, bis(1,2,2,6,6-pentamethyl-4-piperidyl)sebacate, and 8-acetyl-3-dodecyl-7,7,9,9-tetramethyl-1,3,8-triazaspiro[4.5]decane-2,4-dione; quinones or phenols, such as methylhydroquinone, 1,4-naphthoquinone, 4-methoxynaphthol, tert-butylhydroquinone, benzoquinone, pyrogallol, and phenothiazine. The content of the radical scavenger is not limited; however, the content is preferably in a range of 0.0001 to 1 part by mass, optionally 0.0001 to 0.1 parts by mass, or optionally 0.0001 to 0.05 parts by mass, per 100 parts by mass of component (A).

The present composition may further contain, as an optional component, to enhance adhesion property of the present composition, an adhesion promoter is preferably contained. Examples of the adhesion promoter include, but are not limited to: epoxy group-containing alkoxysilanes such as 3-g lycidoxytrimethoxysilane, 3-g lycidoxypropyltriethoxysilane, 3-glycidoxypropylmethoxysilane, 2-(3,4-epoxycyclohexyl)ethyltrimethoxysilane, and 4-oxysilanylbutyltrimethoxysilane; acrylic group-containing alkoxysilanes such as 3-methacryloxypropyltrimethoxysilane, 3-methacryloxypropyltriethoxysilane, and 3-acryloxypropyltrimethoxysilane; amino group-containing alkoxysilanes such as 3-aminopropyltrimethoxysilane, 3-aminopropyltriethoxysilane, N-(2-aminoethyl)-3-aminopropyltrimethoxysilane, and N-phenyl-3-aminopropyltrimethoxysilane; and reaction mixtures of the above epoxy group-containing alkoxysilanes and the above amino group-containing alkoxysilanes. In certain embodiments, the adhesion promoter comprises, or is, selected from reaction mixtures of the above epoxy group-containing alkoxysilanes and the above amino group-containing alkoxysilanes. The content of the adhesion promoter is not limited provided that it is an amount that can impart sufficient adhesion to the organic resin that the composition contacts during curing. In various embodiments, the content of the adhesion promoter is in a range of from about 0.01 to about 10 parts by mass, or optionally in a range of from about 0.01 to about 5 parts by mass, relative to 100 parts by mass of component (A).

The viscosity at 25° C. of the present composition is not limited; however, the viscosity is preferably in a range of 100 to 100,000 mPa·s, optionally in a range of 200 to 100,000 mPa·s, or optionally in a range of 1,000 to 50,000 mPa·s. This is because, when the viscosity of the present composition is greater than or equal to the lower limit of the range described above, a cured product having high mechanical strength can be obtained. On the other hand, when the viscosity is less than or equal to the upper limit of the range described above, excellent coatability/workability of the resulting composition is achieved.

<Cured Product>

The cured product of the present invention is obtained by irradiating the photocurable silicone composition described above with light. Examples of the light used to cure the present composition include ultraviolet light and visible light; however, the light with a wavelength in a range of 250 to 500 nm is preferred. This is because excellent curability is achieved, and the cured product is not decomposed by the light. The ultraviolet-curing is conducted by ultraviolet irradiation. For example, low pressure, high pressure or ultrahigh pressure mercury lamp, metal halide lamp, (pulse) xenon lamp, or an electrodeless lamp is useful as an UV lamp. Irradiation dose is preferably in a range of from 5 to 6,000 mJ/cm², or optionally in a range of from 10 to 4,000 mJ/cm².

The cured product is typically optically transparent. This is because when the cured product is preferably used for an optical device or an image display, optical transparency is desired for high performance. The form of the cured product is not limited and may be in a sheet, film, or block form. The cured product may be combined with various substrates. The cured product is typically laminated between same or different substrates, and especially, between same or different substrates in an optical device.

The state of the cured product is not limited, but it is preferably an elastomer or gel. The hardness is preferably in a range of 10 to 80, or optionally in a range of 10 to 70, in Shore OO Hardness. This is because when the cure product is within the range described above, good cohesive strength against deformation and good flexibility against material fracture are obtained. Note that in the present specification, Shore OO Hardness is the value measured using a type OO hardness according to ASTM D 2240 at 23±2° C.

EXAMPLES

The photocurable silicone composition and the cured product of the present invention will now be described in detail using Practical Examples and Comparative Examples. Note that, in the formulas, "Me", "Ph", and "Vi" respectively indicates methyl group, phenyl group, and vinyl group. The characteristics of the photocurable silicone composition and the cured product thereof were measured as follows.

<Refractive Index>

Using an Abbe refractometer (wavelength of light source: 589 nm), the refractive index at 25° C. was measured.

<Viscosity>

Viscosity at 23±2° C. was measured by using a type B viscometer (Brookfield HA Type Rotational Viscometer with using Spindle #52 at 0.5 or 5 rpm) according to ASTM D 1084 "Standard Test Methods for Viscosity of Adhesive".

<Number Average Molecule Weight (Mn)>

A number average molecule weight (Mn) of the polysiloxane block copolymer was measured by using a gel permeation chromatography and it was converted into a number average molecule weight of a standard polystyrene.

<Thixotropic Property>

Viscosity at 25±2° C. was measured by using a type B viscometer (Brookfield HA Type Rotational Viscometer with using Spindle #52 at 0.5 rpm)/Viscosity at 25±2° C. was measured by using a type B viscometer (Brookfield HA Type Rotational Viscometer with using Spindle #52 at 5 rpm)

<Appearance>

After the photocurable silicone composition was prepared, its appearance was visually observed.

<Curability>

Thickness 2 mm Teflon® zig on glass was prepared. And then UV exposure. After UV cure, finger test was implemented. Curability of the curable silicone composition was evaluated as follows.

○: cured
X: not cured

<Hardness>

The photocurable silicone composition was poured into a mold having a depression of a predetermined shape, and ultraviolet rays were irradiated from the upper liquid surface with a metal halide lamp or LED lamp so that the cumulative irradiation amount was 4,000 mJ/cm². The hardness of the obtained cured product was measured by a type OO hardness according to the method specified by ASTM D 2240-00.

<Transmittance>

Transmittance of a plate-like cured product having a thickness of 2 mm cured as described above were measured by the method specified in ASTM D 1003 (UV-Visible spectrometer).

Reference Examples 1-11

A round bottom flask fitted with a polytetrafluoroethylene (PTFE) stirrer was loaded with a polysiloxane (B1), an organo compound (B2) and a photoinitiator (B3) in a mass % described in Table 1. The mixture was subjected to irradiation with Ultraviolet light at a UV illuminance of 5,000 mJ/cm². After irradiation, a reaction mixture was analyzed by an infrared spectrophotometer, and $^{13}$C-nuclear magnetic resonance spectrum analysis. Absence of Si—CH=CH$_2$ in the reaction mixture was confirmed using the infrared spectrophotometer. And formation of (Si)—C$_2$H$_4$—(S) in the reaction mixture was confirmed using the $^{13}$C-nuclear magnetic resonance spectrum analysis. As a result of NMR analysis, it was found that the reaction mixture was a polysiloxane block copolymer comprising the polysiloxane block and the organo compound block, and having at least two thiol groups per molecule. The results are given in Table 1. The SH/Vi ratio in Table 1 indicates the ratio of the number of moles of thiol (HS-) groups in the organo compound (B2) per 1 mole of the vinyl group in the polysiloxane (B1).

The following polysiloxanes were used as raw material (B1).

(i): a dimethylpolysiloxane having a number average molecular weight of 3600 and refractive index of 1.41, and represented by the following formula:

Me$_2$ViSiO(Me$_2$SiO)$_{46}$SiMe$_2$Vi (ii): a dimethylpolysiloxane having a number average molecular weight of 1330 and refractive index of 1.46, and represented by the following formula:

Ph$_2$ViSiO(Me$_2$SiO)$_{12}$SiPh$_2$Vi (iii): a methylphenylpolysiloxane having a number average molecular weight of 3590 and refractive index of 1.53, and represented by the following formula:

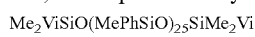

Me$_2$ViSiO(MePhSiO)$_{25}$SiMe$_2$Vi

The following organo compounds were used as raw material (B2).

(iv): pentaerythritol tetrakis(3-mercaptobutyrate) having a molecular weight of 545, refractive index of 1.52, and represented by the following formula:

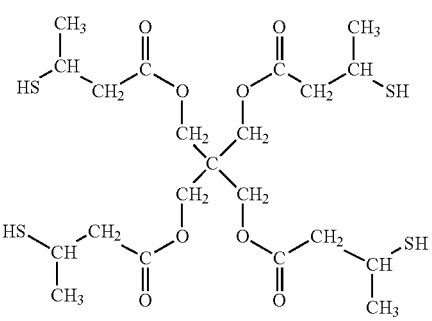 [SMILES: CC(S)CC(=O)OCC(COC(=O)CC(C)S)(COC(=O)CC(C)S)COC(=O)CC(C)S]

(v): trimethylolpropane tris(3-mercaptopropionate) having a molecular weight of 399, refractive index of 1.52, and represented by the following formula:

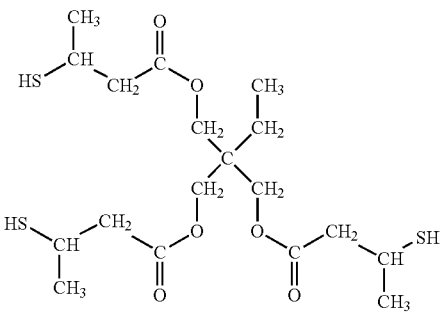 [SMILES: CCC(COC(=O)CC(C)S)(COC(=O)CC(C)S)COC(=O)CC(C)S]

The following photoinitiators were used as raw material (B3).

(vi): 1-hydroxy-cyclohexyl-phenyl-ketone (vii): 2,2-dimethoxy-1,2-diphenylethan-1-one (viii): 2-hydroxy-2-methyl-1-phenyl-propan-1-one (ix): phenylbis(2,4,6-trimethylbenzoyl)phosphine oxide (x): ethyl(2,4,6-trimethylbenzoyl)phenyl phosphonate In Table 1, D, D$^{Ph}$, and D$^{Ph2}$ stands for (CH$_3$)$_2$SiO unit, (CH$_3$)(C$_6$H$_5$)SiO unit, and (C$_6$H$_5$)$_2$SiO unit, respectively.

In Table 1, PE stands for a mixture of an organo block represented by the following formula:

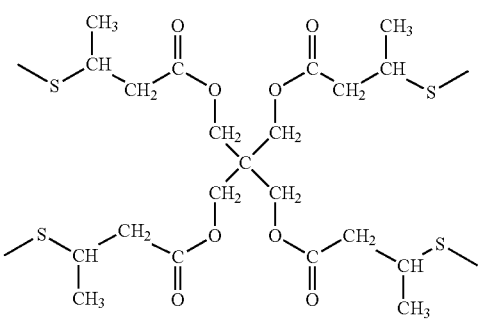

an organo block represented by the following formula:

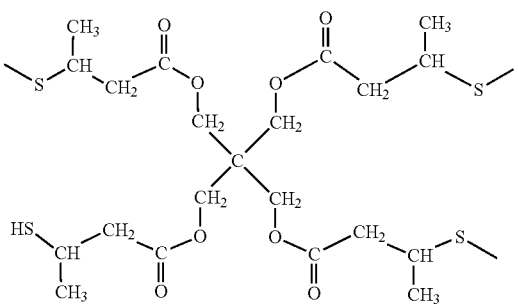

an organo block represented by the following formula:

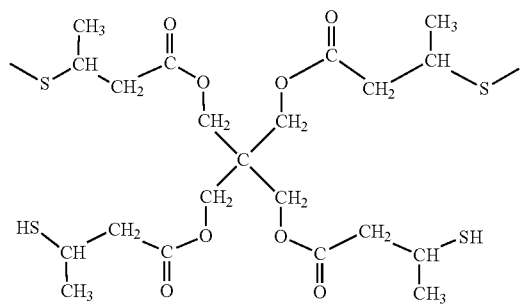

and an organo block represented by the following formula:

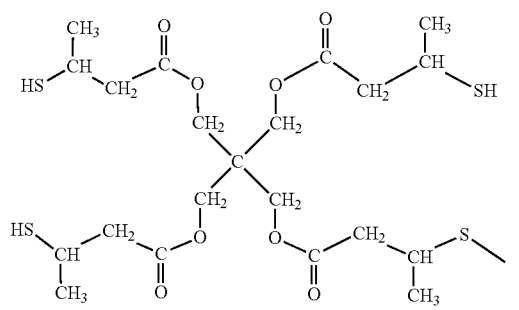 [SMILES: CSC(C)CC(=O)OCC(COC(=O)CC(C)S)(COC(=O)CC(C)S)COC(=O)CC(C)S]

In Table 1, TMMP stands for a mixture of an organo block represented by the following formula:

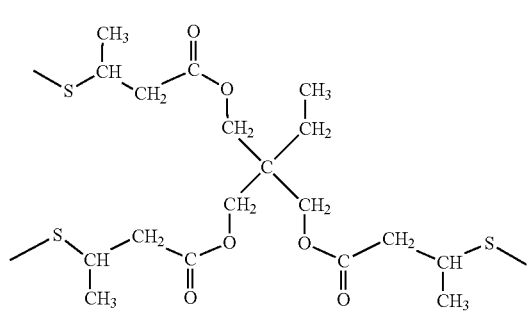

an organo block represented by the following formula:

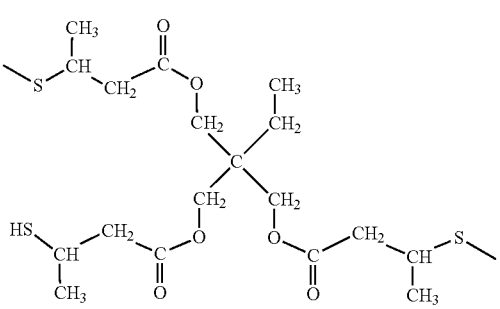

and an organo block represented by the following formula:

TABLE 1

| | | Reference Examples | | | | | | | |
|---|---|---|---|---|---|---|---|---|---|
| | | 1 | 2 | 3 | 4 | 5 | 6 | 7 | 8 |
| (B1) | (i) | — | 5.00 | 11.00 | 15.00 | 60.00 | 11.00 | 11.00 | 11.00 |
| | (ii) | 63.34 | 59.47 | 54.84 | 51.76 | 17.06 | 54.84 | 54.84 | 54.84 |
| | (iii) | — | — | — | — | — | — | — | — |
| (B2) | (iv) | 36.61 | 35.48 | 34.11 | 33.19 | 22.89 | 34.11 | 34.11 | 34.11 |
| | (v) | — | — | — | — | — | — | — | — |
| (B3) | (vi) | 0.05 | 0.05 | 0.05 | 0.05 | 0.05 | — | — | — |
| | (vii) | — | — | — | — | — | 0.05 | — | — |
| | (viii) | — | — | — | — | — | — | 0.05 | — |
| | (ix) | — | — | — | — | — | — | — | 0.05 |
| | (x) | — | — | — | — | — | — | — | — |
| SH/Vi ratio | | 2.81 | 2.81 | 2.81 | 2.81 | 2.84 | | | |
| Polysiloxane Block | | $D_{12}$ | $D_{46+}$ $D_{12}$ | $D_{46+}$ $D_{12}$ | $D_{46+}$ $D_{12}$ | $D_{46+}$ $D_{12}$ | $D_{46+}$ $D_{12}$ | $D_{46+}$ $D_{12}$ | $D_{46+}$ $D_{12}$ |
| Organo Block | | PE | PE | PE | PE | PE | PE | PE | PE |

TABLE 1-continued

| Refractive Index | 1.50 | 1.49 | 1.48 | 1.47 | 1.45 | 1.48 | 1.48 | 1.48 |
|---|---|---|---|---|---|---|---|---|
| Mn | ND | ND | 9,800 | ND | ND | ND | ND | ND |
| Appearance | Clear | Clear | Clear | Clear | Clear | Clear | Clear | Clear |

| | | Reference Examples | | |
|---|---|---|---|---|
| | | 9 | 10 | 11 |
| (B1) | (i) | 11.00 | 11.00 | — |
| | (ii) | 54.84 | 54.84 | — |
| | (iii) | — | — | 63.34 |
| (B2) | (iv) | 34.11 | — | 36.61 |
| | (v) | — | 34.11 | — |
| (B3) | (vi) | — | 0.05 | 0.05 |
| | (vii) | — | — | — |
| | (viii) | — | — | — |
| | (ix) | — | — | — |
| | (x) | 0.05 | — | — |
| SH/Vi ratio | | 2.81 | 2.89 | 7.59 |
| Polysiloxane Block | | $D_{46+}$ $D_{12}$ | $D_{46+}$ $D_{12}$ | $D_{25}^{Ph}$ |
| Organo Block | | PE | TMMP | PE |
| Refractive Index | | 1.48 | 1.48 | 1.53 |
| Mn | | 9,800 | ND | ND |
| Appearance | | Clear | Clear | Clear |

Practical Examples 1-10 and Comparative Example 1

Photocurable silicone compositions were prepared by a planetary centrifugal vacuum mixer (Thinky mixer) from the following components using the composition (parts by mass) shown in Table 2. Note that the photocurable silicone compositions of Practical Examples 1-10 and Comparative Example 1 were prepared to provide 0.8 moles of thiol groups in component (B) with regard to 1 mole of total vinyl groups in component (A). The properties of this photocurable silicone compositions and cured product thereof are shown in Table 2.

The following organopolysiloxanes were used as component (A).

(a1): a copolymer of dimethylsiloxane and diphenylsiloxane having a number average molecular weight of 15040 and refractive index of 1.48, and represented by the following formula:

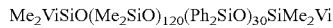

(the average composition formula: $Vi_{0.01}Me_{1.61}Ph_{0.39}SiO_{0.99}$)

(a2): a methylphenylpolysiloxane having a number average molecular weight of 3590 and refractive index of 1.53, and represented by the following formula:

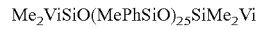

(the average composition formula: $Vi_{0.07}Me_{1.07}Ph_{0.93}SiO_{0.96}$)

The following organic compounds were used as component (B).

(b1): the polysiloxane block copolymer prepared by Reference Example 3
(b2): the polysiloxane block copolymer prepared by Reference Example 10

The following organic compounds were used as comparison of component (B).

(b3): a mixture of component (i), component (ii) and component (iv) in a mass ratio of 11:55:34

The following photoinitiator was used as component (C).
(c1): 1-hydroxy-cyclohexyl-phenyl-ketone The following fillers were used as component (D).
(d1): a hydrophobic fumed silica having a BET specific surface area of 230 m²/g.
(d2): a hydrophobic fumed silica having a BET specific surface area of 100 m²/g.

TABLE 2

| | | | Practical Examples | | | | | |
|---|---|---|---|---|---|---|---|---|
| | | | 1 | 2 | 3 | 4 | 5 | 6 |
| Composition of photocurable silicone compositon (part by mass) | (A) | (a1) | 90 | 90 | 10 | 10 | 90 | 90 |
| | | (a2) | — | — | — | — | — | — |
| | (B) | (b1) | 10 | 10 | 90 | 90 | — | — |
| | | (b2) | — | — | — | — | 10 | 10 |
| | | (b3) | — | — | — | — | — | — |
| | (C) | (c1) | 0.05 | 0.05 | 0.05 | 0.05 | 0.05 | 0.05 |
| | (D) | (d1) | 0.1 | 15 | 0.1 | 15 | 0.1 | 15 |
| | | (d2) | — | — | — | — | — | — |
| Thixo ratio | | | 1.03 | 5.23 | 1.11 | 5.52 | 1.1 | 4.69 |
| Refractive Index | | | 1.480 | 1.480 | 1.480 | 1.481 | 1.492 | 1.492 |
| Appearance | | | Clear | Clear | Clear | Clear | Clear | Clear |
| Curability | | | ○ | ○ | ○ | ○ | ○ | ○ |
| Hardness | | | 15 | 60 | 35 | 65 | 15 | 60 |
| Transmittance | | | 99.8 | 97.3 | 99.8 | 97.2 | 81.0 | 78.6 |

TABLE 2-continued

|  |  |  | Practical Examples | | | | Comparative Examples | |
| --- | --- | --- | --- | --- | --- | --- | --- | --- |
|  |  |  | 7 | 8 | 9 | 10 | 1 | 2 |
| Composition of photocurable silicone compositon (part by mass) | (A) | (a1) | 10 | 10 | 90 | 10 | 90 | — |
|  |  | (a2) | — | — | — | — | — | 90 |
|  | (B) | (b1) | — | — | 10 | 90 | — | — |
|  |  | (b2) | 90 | 90 | — | — | — | — |
|  |  | (b3) | — | — | — | — | 10 | 10 |
|  | (C) | (c1) | 0.05 | 0.05 | 0.05 | 0.05 | 0.05 | 0.05 |
|  | (D) | (d1) | 0.1 | 15 | — | — | — | — |
|  |  | (d2) | — | — | 15 | 15 | 0.1 | 0.1 |
| Thixo ratio |  |  | 1.04 | 2.83 | 4.08 | 4.83 | 1.04 | 1.03 |
| Refractive Index |  |  | 1.502 | 1.502 | 1.480 | 1.481 | 1.491 | 1.534 |
| Appearance |  |  | Clear | Clear | Clear | Clear | Hazy | Hazy |
| Curability |  |  | ○ | ○ | ○ | ○ | ○ | ○ |
| Hardness |  |  | 35 | 65 | 60 | 70 | NA | NA |
| Transmittance |  |  | 78.2 | 76.0 | 86.0 | 85.9 | 73.9 | 71.9 |

INDUSTRIAL APPLICABILITY

The present composition exhibits excellent thixotropic property without impairing transparency. Therefore, the present composition is useful as various potting agents, sealing agents, and adhesive agents for optical devices and image displays.

The invention claimed is:

1. A photocurable silicone composition comprising:
(A) an organopolysiloxane represented by the following average composition formula:

$R^1{}_a R^2{}_b SiO_{(4-a-b)/2}$ wherein, $R^1$ is a $C_{2-12}$ alkenyl group; $R^2$ is a $C_{1-12}$ alkyl group, a $C_{6-12}$ aryl group, or a $C_{7-12}$ aralkyl group; provided that at least one $R^2$ in a molecule is the aryl group or the aralkyl group; and "a" and "b" are positive numbers satisfying: $1 \leq a+b \leq 2.5$ and $0.001 \leq a/(a+b) \leq 0.2$;
(B) a polysiloxane block copolymer comprising:
  (i) a polysiloxane block represented by the general formula: $(R^3{}_2 SiO)_n$, wherein each $R^3$ is independently a $C_{1-12}$ alkyl group, a $C_{6-12}$ aryl group, or a $C_{7-12}$ aralkyl group; and "n" is a positive number of at least about 5; and
  (ii) an organo block containing at least three sulfur atoms and free of silicon atom in a chemical structure thereof,
  wherein the polysiloxane block (i) is bonded to the organo block (ii) via a linkage represented by the general formula: (Si)-$R^4$-(S), wherein Si is an atom in a chemical structure of the polysiloxane block (i); S is an atom in a chemical structure of the organo block (ii); and $R^4$ is a $C_{2-6}$ alkylene group, and
  wherein the polysiloxane block copolymer has at least two thiol (HS-) groups in a molecule, in an amount such that the thiol groups in component (B) is in a range of from 0.2 to 2.0 moles per 1 mole of the total alkenyl groups in component (A);
(C) a photoinitiator, in an amount of from 0.01 to 5 parts by mass of per 100 parts by mass of a total mass of components (A) and (B); and
(D) an inorganic filler, in an amount of from about 0.01 to about 40 parts by mass per 100 parts by mass of a total mass of components (A) and (B).

2. The photocurable silicone composition according to claim 1, wherein the polysiloxane block (i) in component (B) is at least one selected from a group consisting of a polysiloxane block represented by the following formula: $[(CH_3)_2 SiO]_n$
a polysiloxane block represented by the following formula: $[(C_6H_5)_2 SiO]n$
a polysiloxane block represented by the following formula: $[(CH_3)_2 SiO]_{n1}[(C_6H_5)_2 SiO]_{n2}$ and a polysiloxane represented by the following formula: $[(CH_3)(C_6H_5)SiO]_n$
wherein each "n" is a positive number of at least about 5; and each "n1" and "n2" is a positive number, provided that "n1+n2" is a positive number of at least about 5.

3. The photocurable silicone composition according to claim 1, wherein the organo block (ii) in component (B) is at least one selected form a group consisting of an organo block represented by the following formula:

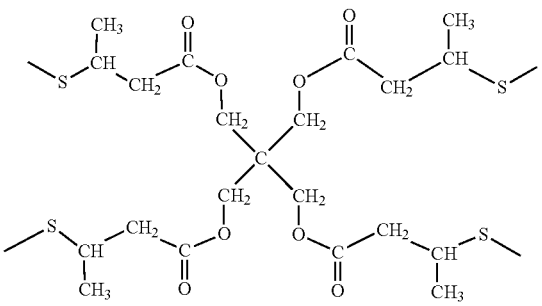

an organo block represented by the following formula:

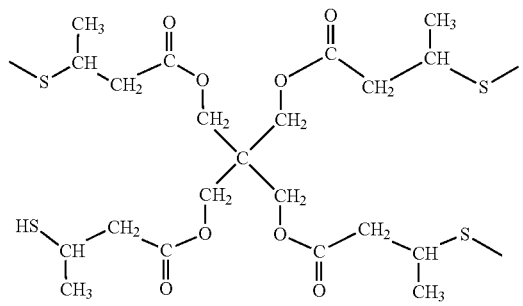

an organo block represented by the following formula:

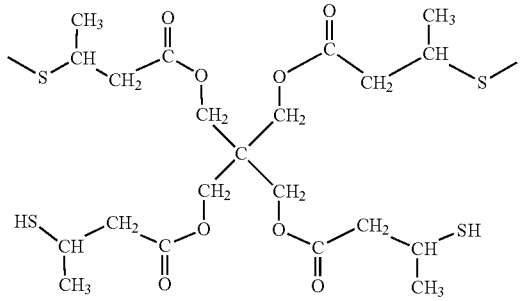

an organo block represented by the following formula:

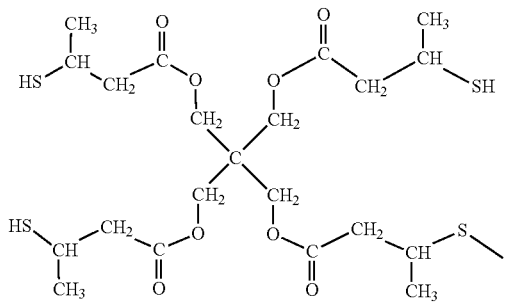 [SMILES: CSC(C)CC(=O)OCC(COC(=O)CC(C)S)(COC(=O)CC(C)S)COC(=O)CC(C)S]

an organo block represented by the following formula:

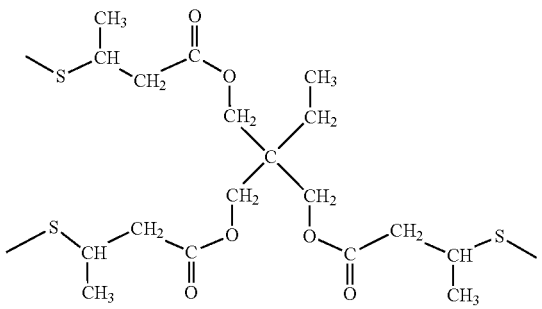

an organo block represented by the following formula:

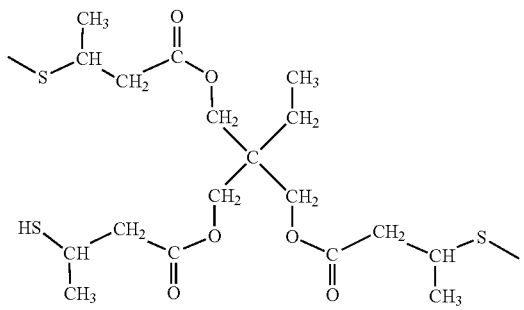

and an organo block represented by the following formula:

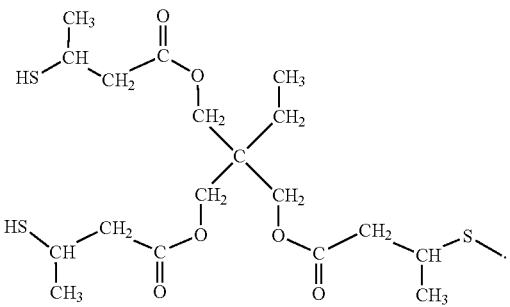

4. The photocurable silicone composition according to claim 1, wherein the content of the polysiloxane block (i) in component (B) is in a range of from about 60 to about 90 mass % of the sum of the polysiloxane block (i) and the organo block (ii).

5. The photocurable silicone composition according to claim 1, wherein component (B) is a reaction product produced by reaction of:

(B1) a polysiloxane represented by the general formula:
$R^5(R^3{}_2SiO)_nSiR^3{}_2R^5$ wherein each $R^3$ is independently a $C_{1-12}$ alkyl group, a $C_{6-12}$ aryl group, or a $C_{7-12}$ aralkyl group; each $R^5$ is independently a $C_{2-6}$ alkenyl group; and "n" is a positive number of at least about 5; and (B2) an organo compound having at least three thiol groups in a molecule; in a presence of (B3) a photoinitiator by irradiation with UV ray.

6. The photocurable silicone composition according to claim 5, wherein raw material (B1) is at least one selected from a group consisting of a polysiloxane represented by the following formula:

a polysiloxane represented by the following formula:

a polysiloxane represented by the following formula:

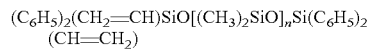

a polysiloxane represented by the following formula:

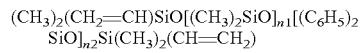

and a polysiloxane represented by the following formula:

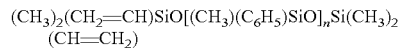

wherein each "n" is a positive number of at least about 5; and each "n1" and "n2" is a positive number, provided that "n1+n2" is a positive number of at least about 5.

7. The photocurable silicone composition according to claim 5, wherein raw material (B1) has a number average molecular weight of from about 500 to about 50,000 in accordance with a standard polystyrene basis by gel permeation chromatography.

8. The photocurable silicone composition according to claim 5, wherein raw material (B2) is at least one selected from a group consisting of an organo compound represented by the following formula:

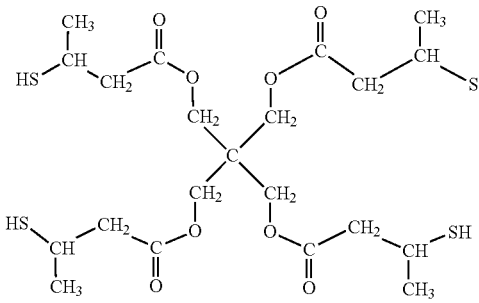

and an organo compound represented by the following formula:

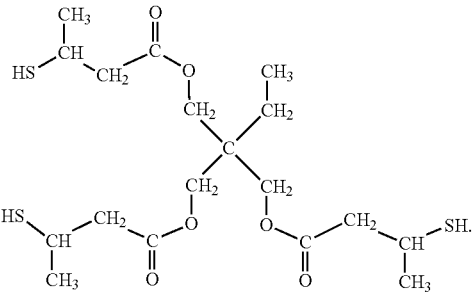 [SMILES: CCC(COC(=O)CC(C)S)(COC(=O)CC(C)S)COC(=O)CC(C)S]

9. The photocurable silicone composition according to claim 5, wherein a reaction amount of raw material (B2) is in an amount such that the thiol groups in raw material (B2) is in a range of from about 2.0 to about 10.0 moles per 1 mole of the total alkenyl groups in raw material (B1).

10. A cured product obtained by irradiating the photocurable silicone composition according to claim 1 with light.

* * * * *